United States Patent Office 3,632,848
Patented Jan. 4, 1972

3,632,848
POST-CHLORINATION OF VINYL CHLORIDE
RESINS IN AQUEOUS SUSPENSION
Warren L. Young and James S. Kennedy, Baton Rouge, La., Norman F. Carnahan, Norman, Okla., and Robert R. Blanchard, Port Allen, La., assignors to The Dow Chemical Company, Midland, Mich.
No Drawing. Filed Mar. 19, 1969, Ser. No. 808,674
Int. Cl. C08f 3/30, 27/03
U.S. Cl. 260—92.8 AC                                6 Claims

ABSTRACT OF THE DISCLOSURE

This invention relates to an improved process for post-chlorinating vinyl chloride resins in aqueous suspension. More particularly, it is directed to a process whereby vinyl chloride resins are chlorinated in aqueous suspension while maintaining such suspension at a temperature above 100° C. but below 140° C. This process eliminates lengthy chlorination induction periods as well as undesirably high reaction pressure and further provides for a rapid means of producing post-chlorinated vinyl chloride resins characterized by high heat distortion values.

---

Prior art methods for post-chlorination of vinyl chloride resins, e.g. polyvinyl chloride resins, include the chlorination of the solution of the resin in a chlorinated solvent such as carbon tetrachloride or tetrachloroethane; the chlorination of a dry, finely divided particulate resin with wet chlorine; and by chlorination of aqueous suspensions of the resins; including various modifications thereof.

The present process represents an improvement in the prior known methods of post-chlorinating vinyl chloride resins in aqueous suspension. These prior known methods are described in U.S. Pat. No. 2,996,489, which involves the chlorination of a water suspension of a porous, granular polyvinyl chloride resin in the presence of a swelling agent and photo-illumination and in the substantial absence of oxygen at a temperature below 65° C. and at atmospheric pressure; and U.S. Pat. 3,100,762 which contemplates such post-chlorination in the presence of from about 5 to 25 percent by volume, based on the total liquid content of the aqueous suspension of a chloromethane swelling agent for the vinyl chloride resin, while in the substantial absence of oxygen and actinic radiation at a temperature of from about 60 to about 90° C. and a gauge pressure of from about 20 to about 80 p.s.i.

The present invention contemplates a process whereby higher reaction temperatures, i.e. temperatures above 100° C. but below 140° C. may be employed with essential elimination of reaction induction time and without the formation of undesirably high reaction pressures. This process further provides for the rapid preparation of post-chlorinated vinyl chloride resins having high heat distortion values and which have excellent resistance to heat induced dehydrochlorination. More particularly, the present invention contemplates the following sequential series of steps in the post-chlorination of vinyl chloride resins in aqueous suspension:

(1) Passing saturating amounts of chlorine gas into an agitated suspension comprising a minor proportion of a macro-granular vinyl chloride resin and a major proportion of an aqueous medium while the suspension is heated to a temperature of at least about 100° C. until initiation of a chlorination reaction, then (2) Upon initiation of the chlorination reaction, maintaining the suspension at a temperature above 100° C. but below about 140° C. in the essential absence of oxygen while maintaining a chlorine over-pressure of at least 2 p.s.i.g. above the autogenous pressure of the system, until the desired amount of chlorine is introduced into the vinyl chloride resin, then (3) Cooling the suspension to a temperature between about 100° C. and 115° C. at which temperature the chlorination reaction essentially stops while maintaining a slight chlorine over-pressure, then (4) Separating the chlorinated product from the suspension and removing excess chlorine.

The vinyl chloride resins useful in the process of this invention include any thermoplastic polymer produced from a monomeric mixture containing not less than about 80 percent by weight of vinyl chloride with the remainder being a 1-monoolefinic or vinyl-type comonomer (i.e. containing a single $CH_2=C$ grouping per molecule) such as vinylidene chloride, vinyl acetate, methyl acrylate, styrene, acrylonitrile, methyl methacrylate, ethylene, propylene and others, with the homopolymer of vinyl chloride monomer being preferred.

By the term "macro-granular" as used herein is meant any granular resin in which essentially all of the particles are above about 10 microns, and preferably above 50 microns in diameter. It is to be understood, however, that the so-called "general purpose" grades of resin containing particles up to 200 microns or more in diameter are perfectly satisfactory. Further, utilization of the relatively porous resins tends to facilitate the diffusion of the chlorine into the particle, and thus is preferred for use in the present process. Exemplary of such preferred resins are those containing from about 5 to 50 percent by volume of pore space.

The process of the present invention further contemplates the utilization of swelling agents such as the chlorinated hydrocarbons having from 1 to 3 carbon atoms. Exemplary of preferred materials are monochloro methane, dichloro methane, trichloro methane, carbon tetrachloride and the members of the chloroethane family. It is an advantage of the present invention, however, that significantly lower levels of swelling agents may be employed, as contrasted to the conventional low temperature post-chlorination techniques, with resultant economics in solvent recovery and lower reactor pressures. More particularly, the present invention contemplates using only enough swelling agent, if any at all, to swell the vinyl chloride resin sufficiently to permit chlorine penetration at the elevated temperatures, with less swelling agent being required at the elevated temperatures where the solvating power of the swelling agent is greatly increased. Further, reaction pressures remain advantageously low due to the effective penetration of the low level of swelling agent into the polymer, which penetration does not readily occur while utilizing temperatures of less than 100° C., i.e. such penetration greatly reduces the activity of the swelling agent (in relation to the way it acts as a free solvent) and thus reduces significantly its partial pressure in the autogenous pressure of the system at elevated temperatures. It has been found that the use in the present invention of greater than about 20 parts by weight of swelling agent per 100 parts by weight of vinyl chloride resin, will cause the organic phase to become essentially a gel at the elevated temperature with such gel becoming virtually impossible to agitate at reasonable slurry concentrations. By comparison, the process of this invention faces only the low viscosities of an aqueous slurry of a solid which is not excessively softened at the chlorination temperatures and which, as the chlorination proceeds and the solids level in the slurry becomes higher, increases in hardness. Thus a higher slurry level can be run, improving the economics of the process.

The absence of gelation and essential fusion of the particles in the process of this invention also often permits one to obtain an after-chlorinated vinyl chloride polymer which has surface characteristics, e.g., porosity and surface area very similar to or essentially the same as those of the starting vinyl chloride polymer.

Further, the absence of or use of only small amounts of swelling agents in the present process essentially completely eliminates the necessity of a solvent recovery step for many base resins and, where no swelling agent is employed, also eliminates the necessity of having to remove traces of swelling agents with attendant advantages in the economics of the process.

It has further been found that the chlorination reaction initiates thermally at the elevated temperatures, thus, unlike the lower temperature processes, the use of a catalyst is often unnecessary.

It has been discovered, however, which discovery forms part of the present invention, that iodine and/or materials capable of generating iodine in the chlorination reaction, are particularly effective as catalysts for such reaction when present in amounts sufficient to generate, under the reaction conditions, the equivalent of up to about 3 parts by weight per 100 parts of vinyl chloride resin. That this is unexpected is illustrated by the fact that equivalent amounts of bromine have been found to be ineffective as a catalyst in the present chlorination process. It has also been surprisingly found that compounds capable of generating the metallic ions $Fe^{+++}$, $Al^{+++}$ and $Zn^{++}$ in the chlorination reaction, are also effective catalysts for such reaction when utilized in amounts up to about 500 parts by weight per million parts of vinyl chloride polymer. Exemplary of such materials are $FeCl_3$, $AlCl_3$ and $ZnCl_2$. That this is unexpected is illustrated by the fact that such materials are known to be deactivated in their usual functions by the presence of only trace amounts of water. It is to be understood that the optimum level and species of catalyst used depends to a great extent on the type of vinyl chloride resin used.

It is a further requirement of the present invention that a chlorine over-pressure of at least 2 p.s.i.g. above the autogenous pressure of the system is utilized during the chlorination process. This is generally adjusted to give a satisfactory chlorination rate and will vary with the characteristics of the starting resin. It must be sufficient, however, to insure that the resin will not be subjected to "chlorine starvation," in which case dehydrochlorination, chain scission or other side reactions may occur and impair the thermal stability of the final product. In this respect it is also necessary to maintain a slight over-pressure of chlorine after the desired chlorination level has been reached and the reaction mixture is being cooled, i.e., until the temperature reaches a level at which the reaction has essentially halted, generally between about 100° and 115° C. It is pointed out that if the reaction slurry is allowed to remain at reaction temperature until the excess chlorine is consumed, dehydrochlorination of the product often occurs, with resultant loss of thermal stability and product utility.

It is also an advantage of the present invention that long induction periods in the reaction are eliminated, and reaction rates are rapid. Lower temperature processes often require long induction periods and/or expensive irradiation equipment to initiate the chlorination reaction. Maintaining adequate reaction rates at the lower temperatures can be a problem without such irradiation equipment or continuous catalyst injection. The higher temperatures utilized in the process of the present invention increase the tendency of the chlorine molecules to dissociate, and the catalyst used is not consumed as are peroxy and azo-type catalysts. Further, by runing the reaction above the boiling point of the system, the problem of dissolved oxygen can be minimized by simply venting the reactor with at most a slight nitrogen purge. With lower temperature processes the reactor must often be purged extensively with nitrogen because displacement and removal of dissolved oxygen by purging occurs slowly and at the lower temperature the solubility of the oxygen is greater.

The present system also enables the reaction to run at faster chlorine rates initially. As the reaction proceeds, the clorination rate drops off, which permits the termination of the reaction at desired chlorine contents without danger of dehydrochlorination due to chlorine starvation.

By way of illustration of the advantages of the present process, it is known to chlorinate vinyl chloride polymers in aqueous suspension with and without a swelling agent; however, a practical process using temperatures above 100° C. to provide post-chlorinated products of high thermal stability, has not been disclosed. Further, the prior art teaches the use of Friedel-Crafts type catalysts ($I_2$, $ZnCl_2$, $AlCl_3$) in the chlorination of vinyl chloride polymers in solution, but that these same catalysts should work in an aqueous chlorination is not heretofore known and is not expected in view of the fact that although these types of catalysts are commonly used in organic halogenation reactions, they are known to be sensitive to the presence of moisture. It is also known in the art that chlorinated vinyl polymers are very sensitive to the presence of trace quantities of the metallic catalyst previously mentioned. The fact that small quantities of these can be used and still yield a product of excellent thermal stability is also unexpected and believed to be attributable to a great extent to their solubility in the aqueous acid phase which permits an efficient and simple washing out of the catalyst residues.

It is further to be noted that a variety of wetting agents, including sulfonates, sulfates, polyphosphates and other types of ionic and non-ionic surfactant materials may be suitably employed, if desired, to assist in wetting the polymer to be chlorinated. Such materials as sodium lauryl sulfate and alkyl aryl polyether alcohols may be advantageously used. It has further been found that the use of wetting agents wherein the hydrophilic portion is an ethylene oxide condensation product are often effective in giving improved color in the formulated resin during processing. As indicated, the employment of a wetting agent facilitates the suspension and uniform distribution of the polymer during the chlorination reaction. In some cases, however, it may not be necessary to employ wetting agents, especially when a freshly prepared polymer is employed that is undried after its preparation or when efficient agitation is available for producing and maintaining the polymer slurry.

The amounts of vinyl chloride resin in the suspension may vary quite widely up to a concentration of about 100 parts by weight of resin per about 480 parts by weight of water. No real lower limit on resin solids content exists, although practical economic considerations require a minimum of not less than about 100 parts by weight of resin per 1800 parts by weight of water.

In the laboratory, the aqueous slurry chlorination of the vinyl chloride resin is generally carried out in a glass reactor charged with polyvinyl chloride resin, water, and any other desirable additives. After the initial charge is placed in the reaction vessel, it is sealed to a Teflon head. The reactor is then pressure tested to insure safe operating conditions and an agitator is started and the reactor temperature is slowly raised. After the temperature of the reactor has been raised to approximately the boiling point of the reactor liquid, the bleed tube on the reactor is blocked off and chlorine is introduced into the reactor. A nitrogen purge can be carried out if desired. This is usually done before the chlorine is introduced because appreciable amounts of oxygen are believed to be detrimental to the thermal stability of the final product.

The temperature of the reactor is allowed to rise to the desired operating temperature and then held essentially constant. The reaction is allowed to proceed until the desired amount of chlorination has taken place. The reactor is then cooled with a slight over-pressure of chlorine maintained until the reaction terminates. This usually takes place between 100 and 115° C. Following termination of the reaction, the chlorine feed is discontinued. The reactor is then cooled to approximately 75° C. for convenience, and the post-chlorinated product removed.

The cooled resin slurry is then filtered or centrifuged to separate the chlorinated product from the water phase and the product separated from excess chlorine, swelling agent, and/or hydrochloric acid by neutralization using a water-soluble base such as the sodium, potassium or ammonium hydroxides, carbonates, phosphates, etc.; or by simply washing the resin with water at room temperature to remove adherent hydrochloric acid followed by a wash with cold acetone or methanol; or by other conventional means including high vacuum drying, steam distillation, etc. The latter step can, of course, be eliminated if no swelling agent is used. Drying of the washed resin can be carried out in air or in vacuum ovens, by suspension driers, and the like employing temperatures that are preferably below about 75° C.

As is typical of all after chlorinated vinyl chloride resins the chlorinated products prepared by the process of this invention are characterized by high inherent stability to heat only when properly stabilized, and it is necessary to include stabilizers therewith to protect such post-chlorinated vinyl chloride resin against possible decomposition by the heat of processing or by subsequent exposure of fabricated products produced therefrom to climatic and environmental conditions of use. Suitable stabilizers include those materials conventionally employed in the preparation of vinyl polymer and copolymer compositions, e.g. organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the chlorinated vinyl chloride resin, other conventional additives, such as non-epoxidized fatty acids and oils, and low molecular weight polymers and waxes may also be employed, if desired. Fillers, extenders, lubricants, coloring dyes and pigments, plasticizers and other conventional additives also can be employed in the usual manner.

The following example, wherein all parts and percentages are by weight, illustrate the present invention but is not to be construed as limiting its scope.

EXAMPLE 1

In each of a series of experiments, 500 grams of a macro-granular polyvinyl chloride and 3,600 ml. of water were placed in a 6-liter glass reaction vessel along with any catalyst, swelling agent and/or wetting agent used. The mixture was then mechanically agitated and the resulting dispersion individually heated to a temperature between 65° C. and 100° C. and purged with oxygen-free nitrogen for a period of about 10 minutes (with the exception of the sample hereinafter identified as Sample No. 1), after which the purge was discontinued and the reactor closed. The reactor was then maintained at a temperature of between 85° C. and 145° C. throughout the chlorination reaction under a chlorine over-pressure of at least 2 p.s.i.g. above the autogenous pressure of the system. After the desired amount of chlorination had taken place, the reactor was cooled to a temperature between about 100° C. to 115° C. while maintaining a slight chlorine over-pressure. The product, in each instance, was isolated by filtration, washed with water and dried in a vacuum oven under a temperature of 50° C. for a period of 48 hours.

The following Tables I and II identify the individual reactions by illustrating the ingredients added, the reaction conditions employed and the physical properties of the resulting products.

The data presented in Tables I and II illustrate the following:

Sample No. 1 (for comparison) deviates from the present invention because it contains substantial quantities of $O_2$ which were trapped in the reactor by eliminating the $N_2$ purge and blocking the vent at 65° C.

Sample No. 2 (for comparison) deviates from the present invention by utilizing a chlorination temperature of 85° C. instead of the required chlorination temperature of between 100° C. and 140° C. After 20 minutes the reaction was still proceeding only very slowly and was therefore terminated.

Sample No. 3 (for comparison) deviates from the present invention by utilization of a chlorination temperature above the maximum temperature of 140° C.

A comparison of comparative Samples Nos. 1, 2 and 3 with Samples Nos. 6, 7 and 8, which were identically prepared except for the noted deviations, shows a noticeable reduction in oven stabilities of the samples prepared using conditions other than those prescribed of the present invention.

Sample No. 4 (also for comparison) deviates from the present invention by utilization of an excessive amount of swelling agent during the chlorination reaction. A comparison with Sample No. 9, which was identically prepared except for the use of the maximum prescribed amount of swelling agent, shows a significant reduction in oven stability and heat deflection temperature in the same prepared using conditions other than those required of the present invention. The reaction was terminated at 63.5% because the entire mass in the reactor had gelled and could not be agitated.

Further, Sample No. 8 (representing the present invention) illustrates the use of a wetting agent wherein the hydrophilic portion thereof is an ethylene oxide condensation product, as preferred by the present process.

By way of further comparison, the polyvinyl chloride utilized in the preparation of Sample Nos. 1 through 9 herein was characterized by an oven stability at 370° F. of about 100 minutes, a heat deflection temperature under 264 p.s.i. of between about 70° C. and 72° C. and a tensile strength of about $8.0 \times 10^3$ p.s.i.

TABLE I.—SAMPLE NUMBERS
(For comparison)

|  | 1 | 2 | 3 | 4 |
|---|---|---|---|---|
| Catalyst | KI | KI | KI | None |
| Swelling agent | None | None | None | (¹) |
| Wetting agent | None | None | None | None |
| Vent closed, temp., ° C | 65 | 85 | 100 | 100 |
| Nitrogen purge | No | Yes | Yes | Yes |
| Chlorination temp., ° C | 125 | 85 | 145 | 125 |
| Percent chlorine in final product | 69.4 | 58.1 | 68.2 | 63.5 |
| Reaction time (min.) | 100 | 20 | 165 | 76 |
| Oven stab. at 370° F. (min.) | 20 | 60 | 30 | 80 |
| Heat deflection temp. under 264 p.s.i. (° C.) | 118 | 77 | 102 | 83 |
| Tensile strength (p.s.i.)×10⁻³ | 10.5 | 8.2 | 10.6 | 9.9 |

¹ 50 gms. CCl₄ per 100 gms. PVC.

TABLE II.—SAMPLE NUMBERS
(The invention)

|  | 5 | 6 | 7 | 8 | 9 |
|---|---|---|---|---|---|
| Catalyst | KI | KI | None | None | None |
| Swelling agent | None | None | None | None | (¹) |
| Wetting agent | None | None | None | (²) | None |
| Vent closed, temp., ° C | 100 | 100 | 100 | 100 | 100 |
| Nitrogen purge | Yes | Yes | Yes | Yes | Yes |
| Chlorination temp., ° C | 125 | 125 | 125 | 125 | 125 |
| Percent chlorine in final product | 68.4 | 67.0 | 67.3 | 66.6 | 66.0 |
| Reaction time (min.) | 139 | 74 | 137 | 116 | 108 |
| Oven stab. at 370° F. (min.) | 160 | 160 | 150 | 160 | 140 |
| Heat deflection temp. under 264 p.s.i. (° C.) | 107 | 100 | 101 | 97 | 90 |
| Tensile strength (p.s.i.)×10⁻³ | 10.9 | 10.3 | 10.5 | 10.2 | 9.7 |

¹ 20 gms. CCl₄ per 100 gms. PVC.
² 6 gms. Zonyl A wetting agent wherein the hydrophilic portion is an hylene oxide condensation product.

What is claimed is:

1. In the process of post-chlorinating vinyl chloride resins in aqueous suspension in the substantial absence of swelling agent the improvement consisting of:
   (1) Passing saturating amounts of chlorine gas into an agitated suspension comprising a minor proportion of a macro-granular vinyl chloride resin and a major proportion of an aqueous medium while said suspension is heated to a temperature of at least about 100° C. until initiation of a chlorination reaction, then (2) Upon initiation of a chlorination reaction maintaining said suspension at a temperature above 100° C. but below 140° C. in the essential absence of oxygen while maintaining a chlorine over-pressure of at least about 2 p.s.i.g. above the autogenous pressure of the system until the desired amount of chlorine is introduced into the vinyl chloride resins, then (3) Cooling said suspension to a temperature at which the chlorination reaction essentially stops while maintaining a slight chlorine over-pressure, then (4) Separating the chlorinated product from said suspension and removing excess chlorine.

2. The process of claim 1, utilizing in combination therewith a material in an amount sufficient to generate under the reaction conditions up to about 3 parts by weight per 100 parts of vinyl chloride resin of iodine.

3. The process of claim 1 utilizing in combination therewith a catalyst capable of generating in the chlorination reaction up to about 500 parts by weight per million parts by weight of the vinyl chloride resin of a metallic ion selected from the group consisting of $Fe^{+++}$, $Al^{+++}$, and $Zn^{++}$.

4. The process of claim 3, wherein said catalyst is selected from the group consisting of $FeCl_3$, $AlCl_3$ and $ZnCl_2$.

5. The process of claim 1 utilizing in combination therewith up to but not in excess of 20 parts by weight per 100 parts of vinyl chloride resin of a chlorinated hydrocarbon swelling agent for said resin.

6. The process of claim 1 utilizing in combination therewith a wetting agent wherein the hydrophilic portion is an ethylene oxide condensation product.

References Cited

UNITED STATES PATENTS

| 3,100,762 | 8/1963 | Shockney | 260—92.8 A |
| 3,366,580 | 1/1968 | Kraemer, Jr., et al. | 260—92.8 A |

FOREIGN PATENTS

| 548,356 | 10/1942 | Great Britain | 260—92.8 A |
| 1,101,540 | 1/1968 | Great Britain | 260—92.8 A |
| 1,377,568 | 9/1964 | France | 260—92.8 A |

JOSEPH L. SCHOFER, Primary Examiner

J. A. DONAHUE, Jr., Assistant Examiner

U.S. Cl. X.R.

260—85.5 XA; 85.5 S, 86.3, 87.1, 87.5, 87.5 C, 87.7